United States Patent
Xu et al.

(12) 
(10) Patent No.: US 11,754,759 B2
(45) Date of Patent: Sep. 12, 2023

(54) ELECTRONIC DEVICES HAVING OPTICAL DIFFUSERS FOR OPTICAL COMPONENTS

(71) Applicant: Apple Inc., Cupertino, CA (US)

(72) Inventors: Tingjun Xu, San Jose, CA (US); Guocheng Shao, Campbell, CA (US); Rui L. Peterson, San Jose, CA (US); Serhan O. Isikman, Redwood City, CA (US); Sunggu Kang, San Jose, CA (US); Tianbo Sun, Sunnyvale, CA (US); Xianwei Zhao, Cupertino, CA (US); Xingxing Cai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 318 days.

(21) Appl. No.: 17/031,625

(22) Filed: Sep. 24, 2020

(65) Prior Publication Data
US 2022/0091308 A1 Mar. 24, 2022

(51) Int. Cl.
G02B 5/02 (2006.01)
G02B 5/20 (2006.01)
G02B 5/28 (2006.01)
G01J 1/42 (2006.01)

(52) U.S. Cl.
CPC .......... *G02B 5/0294* (2013.01); *G01J 1/4204* (2013.01); *G02B 5/0278* (2013.01); *G02B 5/206* (2013.01); *G02B 5/281* (2013.01); *G02B 5/285* (2013.01)

(58) Field of Classification Search
CPC .... G02B 5/0294; G02B 5/0278; G02B 5/206; G02B 5/281; G02B 5/285; G01J 1/4204
USPC .......................................................... 359/599
See application file for complete search history.

(56) References Cited

U.S. PATENT DOCUMENTS

| | | | |
|---|---|---|---|
| 4,090,773 A | 5/1978 | Bauer et al. | |
| 6,391,400 B1 | 5/2002 | Russell et al. | |
| 6,635,342 B1 | 10/2003 | Ben-Zvi et al. | |
| 6,815,065 B2 | 11/2004 | Argoitia et al. | |
| 8,583,187 B2 | 11/2013 | Kim et al. | |
| 8,749,529 B2 | 6/2014 | Powell et al. | |
| 9,806,219 B2 | 10/2017 | Benson et al. | |

(Continued)

FOREIGN PATENT DOCUMENTS

| EP | 3168266 A1 | 5/2017 |
|---|---|---|
| KR | 1020100117978 A | 4/2010 |

(Continued)

*Primary Examiner* — Joseph P Martinez
*Assistant Examiner* — Mitchell T Oestreich
(74) *Attorney, Agent, or Firm* — TREYZ LAW GROUP, P.C.; G. Victor Treyz; David K. Cole

(57) ABSTRACT

An electronic device may have a housing. Input-output devices may be mounted in the housing. The input-output devices may include a display with an array of pixels configured to display images for a user. The electronic device may have an optical component formed under a transparent region in the housing. The transparent region may be associated with an opening in an opaque masking layer in an inactive area of the display or other portion of the electronic device. A diffuser may be formed between the optical component and the transparent region. The diffuser may have a polymer layer with embedded thin-film interference filter flakes configured to scatter light and to exhibit desired reflection and transmission spectral.

20 Claims, 8 Drawing Sheets

(56) References Cited

U.S. PATENT DOCUMENTS

| | | |
|---|---|---|
| 10,222,256 B2 | 3/2019 | Nayak |
| 10,395,620 B2 | 8/2019 | Lyngnes et al. |
| 10,852,574 B2 | 12/2020 | Wilson et al. |
| 2003/0143400 A1* | 7/2003 | Phillips .................... C09C 1/62 428/404 |
| 2003/0224164 A1 | 12/2003 | Argoitia et al. |
| 2006/0216453 A1 | 9/2006 | Hubbard |
| 2010/0328955 A1 | 12/2010 | Cunningham |
| 2014/0022629 A1 | 1/2014 | Powell |
| 2014/0028596 A1 | 1/2014 | Seo et al. |
| 2015/0168618 A1 | 6/2015 | Nakajima |
| 2015/0286327 A1 | 10/2015 | Chakrabarti |
| 2018/0088413 A1 | 3/2018 | Jang et al. |
| 2019/0031889 A1 | 1/2019 | Fujita et al. |
| 2019/0080668 A1* | 3/2019 | Holenarsipur ........... H04N 5/33 |

FOREIGN PATENT DOCUMENTS

| | | |
|---|---|---|
| WO | 1995017479 A1 | 6/1995 |
| WO | 2007054379 A1 | 5/2007 |

* cited by examiner

ELECTRONIC DEVICES HAVING OPTICAL DIFFUSERS FOR OPTICAL COMPONENTS

FIELD

This relates generally to electronic devices, and, more particularly, to electronic devices with optical components.

BACKGROUND

Electronic devices such as laptop computers, cellular telephones, and other equipment are sometimes provided with optical components. For example, ambient light sensors may be incorporated into devices to provide information on current lighting conditions.

SUMMARY

An electronic device may have a housing. Input-output devices may be mounted in the housing. The input-output devices may include a display with an array of pixels configured to display images for a user.

The electronic device may have an ambient light sensor or other optical component that is located under a transparent region in the device. The transparent region may be associated with an opening in an opaque masking layer in an inactive area of the display or may be formed from a housing structure in another portion the electronic device.

A diffuser may be formed between the optical component and the transparent region. The diffuser may have a polymer layer with embedded thin-film interference filter flakes configured to scatter light and to exhibit desired reflection and transmission spectra.

DETAILED DESCRIPTION

Figure 1:
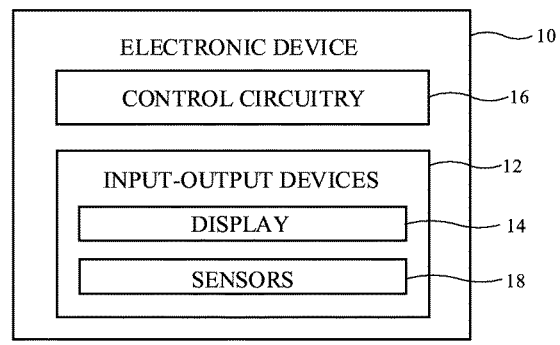
FIG. 1 is a schematic diagram of an illustrative electronic device having a diffuser in accordance with an embodiment.

An illustrative electronic device of the type that may be provided with optical components and diffuser structures is shown in FIG. 1. Light diffusers may be provided to diffuse light for the optical components. The optical components may include components that emit light and/or that detect light. As an example, the optical components may include an optical sensor such as an ambient light sensor.

Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a head-mounted device such as eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be an organic light-emitting diode display, a liquid crystal display, or other display. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, an inertial measurement unit, an accelerometer, a gyroscope, a compass, a microphone, a radio-frequency sensor, a three-dimensional image sensor (e.g., a structured light sensor with a light emitter such as an infrared light emitter configured to emit structured light and a corresponding infrared image sensor, a three-dimensional sensor based on a pair of two-dimensional image sensors, etc.), a camera (e.g., a visible light camera and/or an infrared light camera), a light-based position sensor (e.g., a lidar sensor), and other sensors. Sensors 18 may also include one or more light detectors that are configured to detect ambient light. Sensors 18 may, for example, include one or more monochrome ambient light sensors and one or more color ambient light sensors that are configured to measure ambient light from the environment in which device 10 is operated. A monochrome ambient light sensor may be used to measure ambient light intensity. A color ambient light sensor may be used to measure the color (color spectrum, color temperature, color coordinates, etc.) of ambient light and may be used to measure ambient light intensity.

To make color measurements, a color ambient light sensor in device 10 may have a light detector such as a photodiode that is overlapped by a tunable wavelength filter and/or may have multiple channels each of which has a light detector such as a photodiode that is overlapped by a filter that passes a different color of light (e.g., a different wavelength band) to that light detector. Photodetectors such as photodiodes may be formed in a semiconductor die. By processing the readings from each of the multiple channels, the relative intensity of each of the different colors of light can be determined. Using data from the different channels in a color ambient light sensor, control circuitry 16 can therefore produce ambient light color temperature measurements and other color measurements (e.g., colors represented in color coordinates, etc.). The ambient light color information may be used in controlling display 14 and/or in taking other actions in device 10. As an example, the color cast of images displayed on display 14 can be adjusted based on ambient light color measurements (e.g., to make the images on display 14 yellower in warm ambient lighting conditions and to make the images on display 14 bluer in cold ambient lighting conditions). If desired, display brightness may be automatically increased by control circuitry 16 in response to detection of bright ambient light conditions and may be automatically decreased by control circuitry 16 in response to detection of dim ambient light conditions. Adjustments to the brightness of the image on display 14 in this way based on ambient light sensor measurements from an ambient light sensor in device 10 may help enhance user comfort when viewing images.

Electronic device 10 may include one or more ambient light sensors. Illustrative arrangements in which device 10 includes a single ambient light sensor are sometimes described herein as an example. In some configurations, the ambient light sensor may be located directly under or nearly under display 14 (e.g., under an active display area or under an inactive border of a display, in an inactive notch formed along an edge of an active display area, in an inactive island that forms a window area within an active display area, etc.).

Sensors 18 such as ambient light sensors, image sensors, optical proximity sensors, lidar sensors, and other sensors that use light and/or components that emit light such as status indicator lights and other light-emitting components may sometimes be referred to as optical components. Optical components in device 10 may, if desired, be mounted under diffusers. The diffusers may diffuse incoming light and/or light that is emitted by an optical component. As an example, a diffuser may overlap an ambient light sensor to help diffuse incoming ambient light and thereby make the ambient light sensor insensitive to device orientation (e.g., when the ambient light sensor is making ambient light measurements in the presence of specular lighting).

Figure 2:
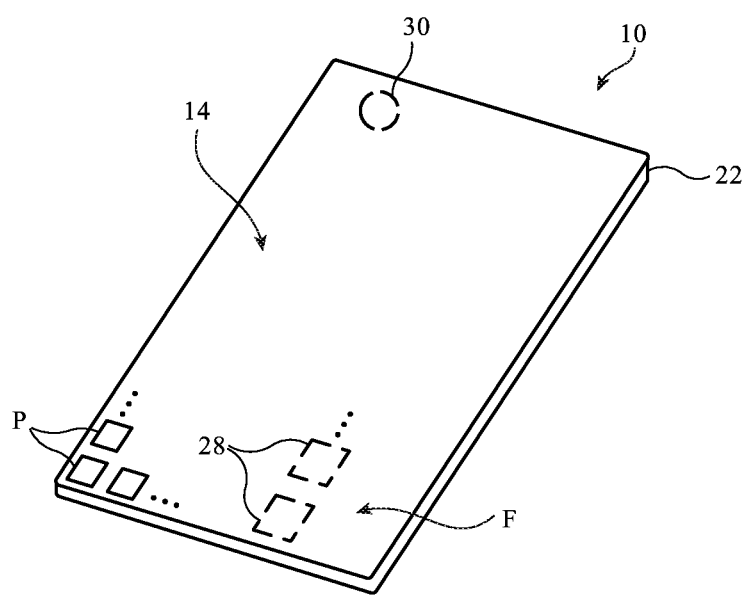
FIGS. 2 and 3 are perspective views of illustrative electronic devices in accordance with embodiments.

A perspective view of an illustrative electronic device of the type that may include an ambient light sensor or other optical component with a diffuser is shown in FIG. 2. In the example of FIG. 2, device 10 includes a display such as display 14 mounted in housing 22. Display 14 may be a liquid crystal display, a light-emitting diode display such as an organic light-emitting diode display or a display formed from crystalline semiconductor light-emitting diode dies, or other suitable display. Display 14 may have an array of pixels P extending across some or all of front face F of device 10 and/or other external device surfaces. The pixel array may be rectangular or may have other suitable shapes. Display 14 may be protected using a display cover layer (e.g., a transparent front housing layer) such as a layer of transparent glass, clear plastic, sapphire, or other clear layer. The display cover layer may overlap the array of pixels P.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 and display 14 may separate an interior region of device 10 from an exterior region surrounding device 10. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a strap may be coupled to a main portion of housing 22 (e.g., in configurations in which device 10 is a wristwatch or head-mounted device). Internal electrical components 28 (e.g., integrated circuits, discrete components, etc.) for forming control circuitry 16 and input-output devices 12 may be mounted in the interior of housing 22. In some configurations, components 28 may be attached to display 14 (e.g., circuitry may be mounted to the inner surface of display 14).

Pixels P may cover all of the front face of device 10 or display 14 may have inactive areas (e.g., notches, rectangular islands, inactive border regions, or other regions) that are free of pixels P. The inactive areas may be used to accommodate an opening for a speaker and windows for optical components such as image sensors, an ambient light sensor, an optical proximity sensor, a three-dimensional image sensor such as a structured light three-dimensional image sensor, a camera flash, an illuminator for an infrared image sensor, an illuminator for a three-dimensional sensor such as a structured light sensor, a time-of-flight sensor, a lidar sensor, etc.

To permit light associated with an optical component to pass from the interior of device 10 to the exterior of device 10 and/or to pass from the exterior of device 10 to the interior of device 10, display 14 or other portion of the housing of device 10 that forms an exterior device surface may be provided with one or more optical component windows. An optical component window may be formed from a portion of device 10 (e.g., a region of the housing of device 10) with sufficient transparency to allow the optical component to operate satisfactorily. For example, an optical component window for an optical component such as an ambient light sensor may have sufficient transparency to ambient light at one or more wavelengths of interest to allow the ambient light sensor to sense that ambient light after the ambient light has passed through the window.

An optical component may be mounted in any suitable location in device 10. For example, an optical component may be mounted under a window opening in housing 22 (e.g., a sensor may be mounted under a hole in a metal housing wall), may be formed under the active area of display 14, may be formed under an inactive display area, may be formed under a housing layer formed from clear glass or polymer, etc. In an illustrative configuration, an optical component may be located in alignment with an optical component window in a region such as optical component region 30 of FIG. 2. For example, device 10 may contain an ambient light sensor that is aligned with an optical component window that serves as an ambient light sensor window in region 30 (e.g., on front face F of device 10).

Figure 3:
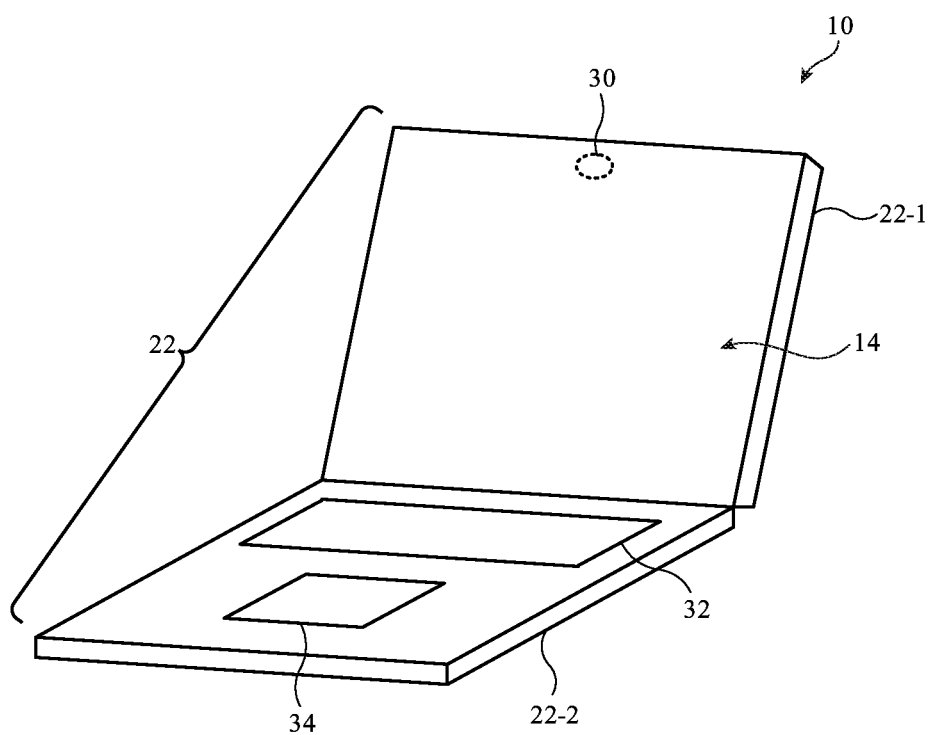

Device 10 of FIG. 2 may be a cellular telephone, tablet computer, wristwatch, head-mounted device, or other portable device (as examples). If desired, ambient light sensors and other optical components may be provided in other electronic equipment. In the example of FIG. 3, device 10 is a laptop computer. Housing 22 of device 10 of FIG. 3 includes upper housing portion 22-1 and lower housing portion 22-2, which are joined by a hinge to allow these portions to rotate with respect to each other. Display 14 may be mounted in upper housing portion 22-1. Keyboard 32 and trackpad 34 may be mounted in lower housing portion 22-2. Ambient light sensors and other optical components with diffusers may be mounted on housing 22 facing the exterior of device 10. As an example, an optical component may be mounted under an active area of display 14 that is configured to display an image or an inactive area of display 14 (see, e.g., illustrative optical component region 30).

To help hide internal components in the interior of housing 22 from view, the inactive area of display 14 may be provided with an opaque masking layer. The opaque masking layer may be any suitable color (e.g., black, gray, white, a non-neutral color such as blue, etc.). In an illustrative example, display 14 has an inactive area with an opaque masking layer formed from black ink. Other opaque materials may be used, if desired.

Optical component windows may be formed from openings in an opaque masking layer and/or from portions of an opaque masking layer that otherwise have sufficient transparency to allow optical components associated with the optical component windows to operate satisfactorily.

As an example, an ambient light sensor window or other optical component window may be formed in an opaque masking layer that overlaps region 30. The shape of region 30 (e.g., the outline of the optical component window that is formed from the opaque masking layer opening when viewed from the exterior of device 10) may be circular, rectangular, or may have other suitable shapes. The opening may be completely free of opaque masking material (e.g., the opening may be a circular hole, etc.) or may contain opaque masking layer material with a sufficient transparency to allow the optical component under the opening to operate.

To enhance the uniform appearance of the inactive area of display 14 and prevent the window in the opaque masking layer from being overly noticeable to a user of device 10, a dark layer of partly transparent structures may overlap the window. The window may, as an example, be configured to exhibit a light transmission of about 2-16%, at least 3%, 5-10%, 8%, at least 4%, at least 6%, less than 20%, less than 10%, or other suitable light transmission value. In some configurations, the structures formed in the window may have a dark appearance that helps make the optical component window visually blend with adjacent portions of the opaque masking layer. A diffuser may, if desired, be used to adjust the appearance of the window (e.g., by adjusting the amount of light reflected from the window to match surrounding portions of device 10) in addition to providing the window with haze.

Figure 4:
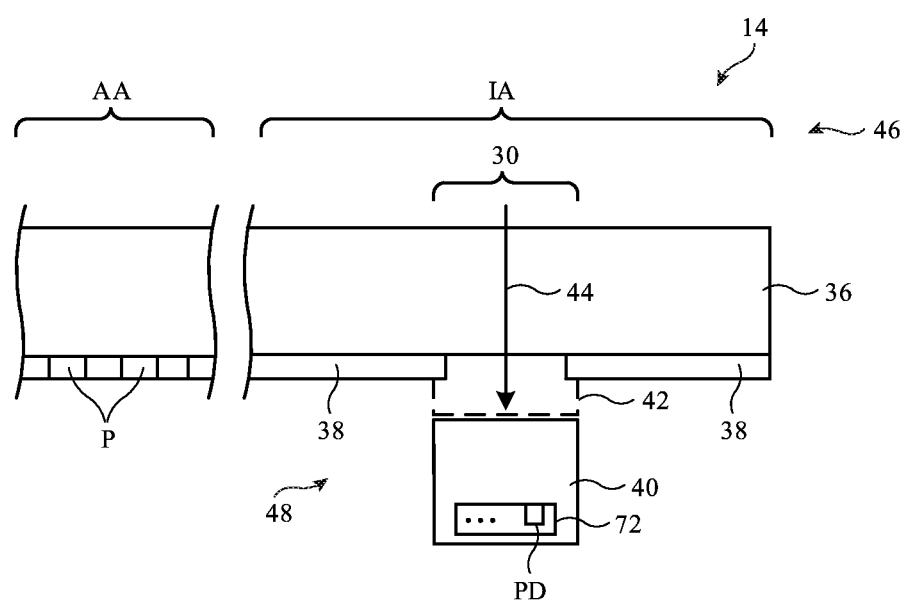
FIG. 4 is a cross-sectional side view of an illustrative electronic device with a diffuser for an optical component in accordance with an embodiment.

FIG. 4 is a cross-sectional side view of an illustrative display with an optical component (e.g., an ambient light sensor or other optical component). Display 14 of FIG. 4 has an active area AA that displays images and an inactive area IA that is covered with opaque masking material and does not display images.

In the example of FIG. 4, display 14 has a transparent display cover layer such as display cover layer 36. Display cover layer 36 may be formed from glass, polymer, sapphire or other crystalline materials, and/or other transparent materials. In active area AA, display 14 has an array of pixels P for displaying an image. Pixels P may, for example, form a light-emitting diode display panel such as a thin-film organic light-emitting diode display panel or a display panel having a pixel array formed from crystalline semiconductor light-emitting diode dies (as examples). Configurations in which display 14 is a liquid crystal display may also be used. As shown in FIG. 4, in inactive area IA of display 14, pixels P are not present. Opaque making layer 38 may be formed on the underside (inner surface) of display cover layer 36 in inactive area IA to hide internal components in interior region 48 from view from a user in the external environment (exterior region 46) surrounding device 10.

An optical component may be aligned with an optical component window. In the example of FIG. 4, optical component 40 is mounted in alignment with an opening in opaque masking layer 38 in region 30 that forms an optical component window. The optical component window formed by the opening in layer 38 allows optical component 40 to transmit and/or receive light. For example, in a configuration in which component 40 is an ambient light sensor, the optical component window allows the ambient light sensor to receive and measure ambient light 44 that passes through display cover layer 36.

If desired, a layer such as layer 42 may overlap the opening in layer 38 and an associated optical component in the interior of device 10 such as component 40. Layer 42 may include a diffuser and/or other optical structures. In an illustrative arrangement, a diffuser in layer 42 is formed from a layer of polymer with embedded flakes of thin-film interference filter material. The thin-film interference filter flakes may be configured to provide desired amounts of light reflection and transmission for light at various wavelengths.

Other optical structures may be formed in layer 42, if desired (e.g., an adhesive layer to help mount optical structures within device 10 in alignment with an optical component such as component 40, a coating such as an ink layer or other layer of material with a desired appearance such as a desired color, darkness, and/or other appearance attributes that help visually match the appearance of region 30 to the appearance of other portions of device 10, and/or other structures). Arrangements in which layer 42 includes a diffuser formed from flakes of thin-film interference filter material are sometimes described herein as an examples Layer 42 may be formed as a coating (e.g. a coating on the underside of layer 36, a coating on a separate substrate layer, etc.). Although layer 42 is formed within opening in layer 38 between layer 36 and component 40 in the example of FIG. 4, layer 42 may be mounted in any suitable location in device 10 (e.g., overlapping one or more optical components). The configuration of FIG. 4 is an example.

Component 40 may be a light-emitting component (e.g., an optical component that includes a light-emitting device such as a laser or light-emitting diode such as a status indicator light, a flood illuminator for an image sensor, a light source for a gaze tracking sensor, a camera flash, etc.), may be an optical sensor such as an image sensor, may be an ambient light sensor, may be an optical proximity sensor, may be a lidar sensor, and/or may be any other optical component. Component 40 may emit and/or detect ultraviolet light, visible light (e.g., light from 380 to 740 nm), and/or infrared light (e.g., near infrared light).

In an illustrative configuration, which may sometimes be described herein as an example, component 40 is an ambient light sensor. As shown in FIG. 4, an ambient light sensor may include an ambient light sensor semiconductor die such as die 72 (e.g., a silicon die). Die 72 contains circuitry such as photodetectors PD (e.g., photodiodes) and/or other circuitry for gathering ambient light measurements. The light diffuser of layer 42 (and/or light filters overlapping respective photodetectors PD) may be configured to pass desired wavelengths of light to photodetectors PD. For example, the light diffuser of layer 42 may be desired to pass all visible light and/or visible light of particular wavelengths while blocking all infrared light or infrared light of particular wavelengths (as examples). If desired, individual light filters may overlap respective photodetectors PD and may be configured to pass bands of wavelengths of different associated colors, thereby allowing component 40 to serve as a color ambient light sensor. There may be any suitable number of photodetectors PD on die 72 (e.g., at least 3, at least 6, at least 10, fewer than 25, fewer than 12, fewer than 9, 1, 2, etc.).

To provide layer 42 with desired optical properties, such as desired amounts of visible and infrared light transmission and reflection, desired amounts of light diffusion (e.g., desired amounts of haze to avoid angular dependencies during ambient light readings that might otherwise arise when using device 10 in a specular lighting environment with one or more directional light sources), and/or other desired optical proprieties, layer 40 may be formed from flakes of thin-film interference filter material. For example, thin-film interference filter flakes may be formed by depositing a series of thin-film dielectric layers to form a dielectric stack and subsequently breaking the deposited dielectric stack into small flakes. The thin-film interference filter flakes may then be embedded in a polymer to form layer 42.

Figure 5:
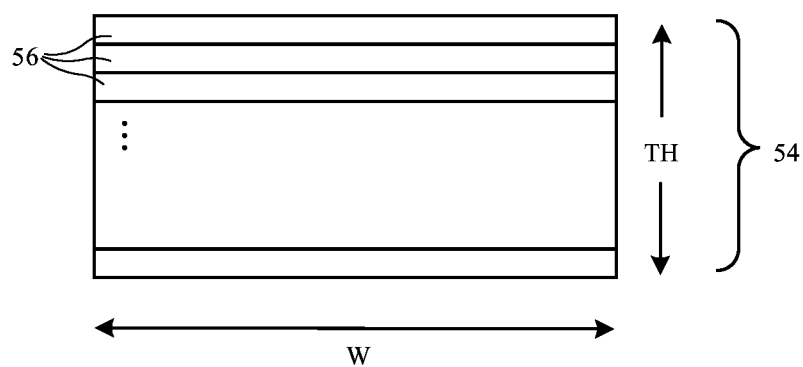
FIG. 5 is a cross-sectional side view of layers of material that may be configured to form thin-film interference filter flakes for a diffuser in accordance with an embodiment.

A cross-sectional side view of an illustrative flake of thin-film interference layer material is shown in FIG. 5. As shown in FIG. 5, thin-film interference filter flake 54 (which may sometimes be referred to as a particle) may be characterized by a stack of dielectric thin-film layers 56. Layers 56 may be organic layers and/or inorganic layers. As an example, layers 56 may be formed from oxides, nitrides, and/or other inorganic materials (e.g., silicon oxide, metal oxides such as aluminum oxide, titanium oxide, tantalum oxide, or niobium oxide, silicon nitride, and/or other inorganic materials). The refractive indices of layers 56 and the thickness of layers 56 may be configured to provide the dielectric stack with desired light transmission and light reflection spectra.

In an illustrative configuration, layers 56 have refractive index values that alternate (e.g., between a higher refractive index value and a lower refractive index value) and are characterized by thicknesses of 5 nm-700 nm, 50-200 nm, less than 600 nm, less than 1000 nm, less than 300 nm, less than 150 nm, less than 25 nm, at least 20 nm, at least 30 nm, at least 55 nm, at least 50 nm, at least 100 nm, at least 150 nm, at least 250 nm, at least 400 nm, 80-150 nm, or other suitable thickness values. The number of layers 56 in the dielectric stack may be at least 5, at least 10, at least 20, at least 75, fewer than 200, fewer than 50, fewer than 25, other suitable value. The overall thickness TH of the thin-film dielectric layers in flakes such as flake 54 (e.g., the thickness of layers 56 omitting any optional supporting substrate layer) may be at least 0.1 microns, at least 1 micron, at least 3 microns, less than 25 microns, less than 5 microns, less than 2.5 microns, or other suitable thickness.

Flakes 54 may be formed by depositing layers 56 on a substrate (e.g., a layer of glass or polymer) and breaking the stack of layers 56 (and, if desired, the substrate) into pieces (e.g., by crushing, grinding, shredding, cutting, etc.). The substrate (e.g., a clear layer of glass or polymer) may remain attached to layers 56 after flake formation or flakes 54 may be removed from the substrate that was used as a supporting layer during deposition.

It may be desirable for flakes 54 to scatter light. This may allow flakes 54 to be used in forming a diffuser in layer 42 (e.g., a light diffusing layer in which light is scattered by Mie scattering). In this way, layer 42 may form a light diffuser with a desired amount of haze (e.g., at least 5%, at least 10%, at least 20%, at least 40%, at least 70%, at least 85%, less than 99.9%, 10-99%, 20-99%, or other suitable haze value). Desired amounts of light scattering may be achieved by forming flakes with lateral dimensions W that are on the order of a wavelength of light (at a wavelength of interest such as a visible light wavelength and/or an infrared light wavelength). The size of W may be, for example, 0.05-5 microns, 0.1-2.5 microns, 0.2-1.5 microns, at least 0.25 microns, less than 2 microns, less than 10 microns, or other suitable value. Flakes 54 may have roughly circular shapes (outlines when viewed from above) or may have other suitable shapes.

Figure 6:
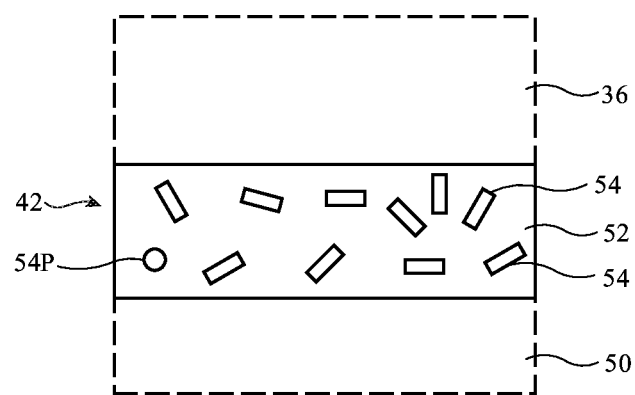
FIG. 6 is a cross-sectional side view of an illustrative diffuser in accordance with an embodiment.

FIG. 6 is a cross-sectional side view of layer 42 in an illustrative configuration in which layer 42 forms a diffuser. As shown in FIG. 6, flakes 54 may be embedded in a layer of polymer such as polymer layer 52. The orientation of flakes 54 may be random or the thickness of layer 52 may be configured to help hold flakes 54 in a somewhat horizontal orientation. Polymer layer 52 may be a film that is attached to the underside of cover layer 36 by a layer of adhesive, may be a film that is attached to the upper portion of component 40 or a separate substrate layer such as substrate layer 50 (e.g., a layer of glass, polymer, etc.) using a layer of adhesive, or may be deposited on the underside of layer 36 or the surface of substrate layer 50 as a coating.

If desired, additional light-scattering particles such as particle 54P of FIG. 6 may be incorporated into layer 52. Particles 54P may be formed from inorganic particles (e.g., metal oxide particles, silicon oxide particles, etc.) or other particles formed from materials with refractive index values that differ from the refractive index of layer 52. Particles 54P may, if desired, have lateral dimensions selected to scatter light (e.g., 0.05-5 microns, 0.1-2.5 microns, 0.2-1.5 microns, at least 0.25 microns, less than 2 microns, less than 10 microns, or other suitable value). Particles 54P and/or additives to layer 52 may include colorants (e.g., dyes and/or pigments) such as carbon black particles, colored dyes, etc. to help provide layer 42 with a desired appearance (e.g., a desired color).

In the presence or absence of additives and/or particles 54P, the thin-film interference filters formed from thin-film interference filter flakes 54 can be configured to adjust the optical properties of layer 42 and therefore the appearance of layer 42. As an example, the thin-film interference filters formed by flakes 54 may be configured to reflect infrared light and pass visible light in one or more wavelength bands of interest. This allows layer 42 to serve both as a diffuser and as a filter layer that exhibits light transmission bands suitable for allowing layer 42 to be used with an overlapped optical component. The appearance of layer 42 that is created by selection of an appropriate reflection spectrum (and transmission spectrum) for layer 42 (e.g., by adjusting the layer thicknesses and other properties of thin-film layers 56 in thin-film interference filter flakes 54) may be mated to the appearance of layer 38 and may be characterized by a neutral color (e.g., black, gray, or white) or a non-neutral color (e.g., red, blue, gold, yellow, green, and/or other non-neutral colors).

Figure 7:
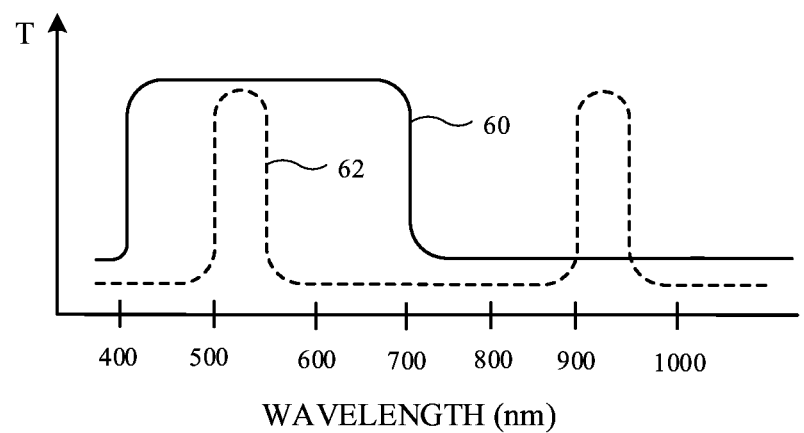
FIGS. 7, 8, and 9 are graphs showing illustrative spectral characteristics for diffusers formed from flakes of thin-film interference filter material in accordance with embodiments.
Figure 8:
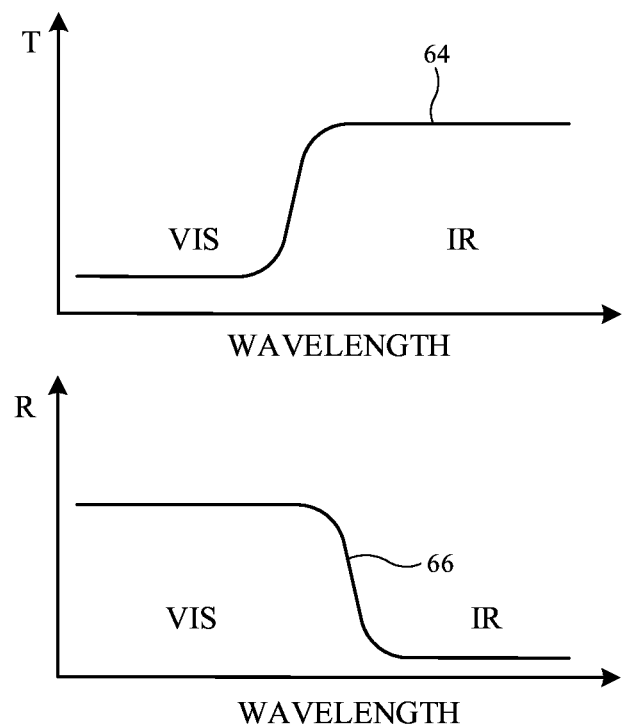
Figure 9:
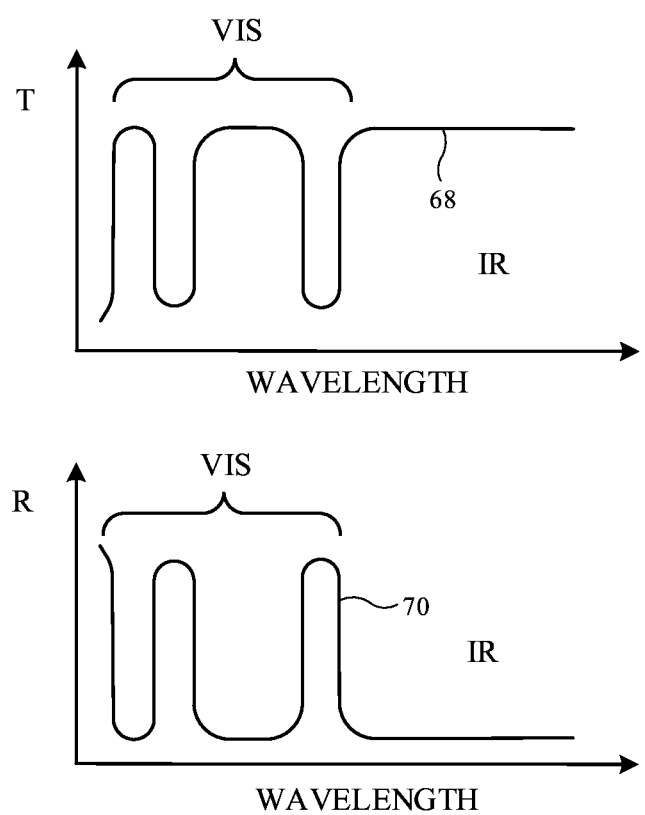

FIGS. 7, 8, and 9 are graphs of illustrative transmission and reflection characteristics (transmission spectra and reflection spectra) for layer 42 that may be implemented by adjusting the thicknesses and refractive index values of layer 56 in flakes 54.

As shown by illustrative curve 60 in the example of FIG. 7 in which light transmission T for layer 42 has been plotted as a function of wavelength, the thin-film interference properties of flakes 54 may be adjusted to provide layer 42 with a visible light transmission (e.g., a value of light transmission at visible light wavelengths such as 525 nm or all visible light wavelengths between 380 nm and 740 nm) of 50%, 2-95%, less than 90%, more than 1%, more than 2%, more than 4%, more than 40%, or other suitable value). This visible light transmission level may be larger than the level of transmission at infrared wavelengths (which may be, as an example, less than 10%, less than 1%, at least 0.01%, or other suitable value).

If desired, the visible light transmission spectrum for layer 42 may exhibit pass bands and stop bands. As shown by illustrative curve 62 of FIG. 7, for example, layer 42 may pass light at a band centered on a particular visible light wavelength (e.g., 525 nm) and may block other visible wavelengths. All infrared wavelengths may be blocked or one or more infrared pass bands may be formed (e.g., curve 62 may exhibit high light transmission at a band of wavelengths surrounding 940 nm or other suitable infrared wavelength band in which it is desired to transmit infrared light). Blocking some or all infrared light transmission through layer 42 may help prevent ambient infrared light from affecting measurements of ambient light color and intensity by an ambient light sensor. Infrared light blocking and visible light blocking may also be used in forming filter layers for other optical components (e.g., sensors, light-emitters, etc.).

FIG. 8 contains graphs of transmission T and reflection R for layer 42 as a function of wavelength for another illustrative configuration of flakes 54. As the illustrative graphs of transmission T (curve 64) and reflection R (curve 66) in FIG. 8 demonstrate, light reflection in the visible portion of the spectrum (VIS) may be higher than light reflection in the infrared portion of the spectrum (IR) and light transmission in the visible may be lower than light reflection in the infrared. This type of arrangement may be used, for example, to block visible light for an infrared optical component and to provide layer 42 (and therefore region 30) with a desired visible light appearance and a desired opacity.

If desired, the visible and/or the infrared portions of the transmission and reflection characteristics for layer 42 may have multiple peaks and/or valleys, allowing the outward appearance (color, opacity, etc.) of layer 42 (and thereby the optical window in region 30) to be adjusted while allowing the light transmission properties of layer 42 (and thereby the optical window in region 40) to be adjusted so that the overlapped optical component 40 under layer 42 operate satisfactorily. Consider, as an example, the transmission and reflection spectra of layer 42 associated with illustrative transmission curve 68 and reflection curve 70 of FIG. 9. In the FIG. 9 example, the dielectric stacks of flakes 54 have been configured to provide the reflection spectrum of layer 42 with multiple visible light reflection peaks, separated by wavelength bands of lower reflection. By selecting the number of peaks, the spectral widths of the peaks, the wavelength bands associated with the peaks, and the magnitudes of the peaks, the outward color and other appearance attributes of layer 42 and the optical window formed in region 30 may be configured as desired. Infrared light transmission in this type of configuration may adjusted to be relatively high (e.g., when component 40 is an infrared component) or relatively low (e.g., to prevent infrared interference with the operation of a visible light component). The peaks and valleys in the visible light portion of the spectrum may be adjusted to allow light for a visible light component to pass.

By configuring the spectral characteristics of the diffuser formed from layer 42 using adjustments to thin-film interference filter flakes 54, the diffuser may be provided with a desired appearance (e.g., a neutral color or non-neutral color that matches the color of layer 38 or other suitable color) and may be used with optical components that operate at visible and/or infrared wavelengths (e.g., wavelengths aligned with visible and/or infrared pass bands, etc.). Spectral characteristics such as peaks and valleys in the visible light portion of the spectrum may be adjusted to allow light for a visible light component to pass and/or spectral characteristics such as peaks and valleys in the infrared light portion of the spectrum may be adjusted to allow light for an infrared light component to pass.

As these examples demonstrate, the outward appearance of layer 42 (e.g., the appearance of layer 42 through an overlapping transparent portion of device 10 such as display cover layer 36, a transparent rear housing wall, a transparent sidewall, or other transparent housing structure or other portion of device 10 on which layer 42 may be viewed) may be adjusted by selecting appropriate thicknesses and materials (and therefore refractive index values) for layers 56 in flakes 54 and/or by selecting other attributes for layer 42 (e.g., flake size, the type of polymer used for forming polymer layer 52, the presence (or absence) of haze-promoting light-scattering particles such as particles 54P, etc. The attributes of layer 56 may be selected to form thin-film interference filters from flakes 54 that exhibit desired light transmission spectra and desired light reflection spectra over wavelength ranges of interest (e.g., visible and/or infrared light). The angular distribution of light rays relative to the surfaces of flakes 54 can be adjusted by selecting an appropriate thickness for polymer layer 52. When polymer layer 52 is relatively thin, flakes 54 will tend to lie flat and will have a relatively smaller range of different angular orientations with respect to the surface normal of layer 36. When polymer layer 52 is thicker, flakes 54 may have an opportunity to exhibit a larger random distribution of angular orientations, which may broaden the spectral peaks and valleys exhibited in the transmission and reflection spectra.

The foregoing is merely illustrative and various modifications can be made to the described embodiments. The foregoing embodiments may be implemented individually or in any combination.

Table of Reference Numerals

| 10 | Electronic device | 12 | Input-output devices |
|----|-------------------|----|----------------------|
| 14 | Display | 18 | Sensors |
| 16 | Control circuitry | 22 | Housing |
| P | Pixels | 30 | Region |

-continued

Table of Reference Numerals

| | | | |
|---|---|---|---|
| F | Front face | 28 | Components |
| 22-1, 22-2 | Housing portions | 32 | Keyboard |
| 34 | Trackpad | 44 | Light |
| 38 | Opaque masking layer | 42 | Layer |
| 48 | Interior region | 40 | Optical component |
| 72 | Die | PD | Photodetectors |
| 46 | Exterior region | AA | Active area |
| IA | Inactive area | 36 | Cover layer |
| 56 | Layers | TH | Thickness |
| W | Lateral dimension | 54 | Flake |
| 50 | Layer | 54P | Particle |
| 52 | Polymer layer | 60, 62, 64, 66, 68, 70 | Curves |

What is claimed is:

1. An electronic device, comprising:
a display having an array of pixels configured to display an image;
an opaque masking layer in a portion of the display, wherein the opaque masking layer has an optical component opening;
an optical component aligned with the optical component opening; and
a layer of polymer with embedded thin-film interference filter flakes each of which has a stack of thin-film inorganic dielectric layers, wherein the layer of polymer with the embedded thin-film interference filter flakes is between the optical component opening and the optical component, and wherein the embedded thin-film interference filter flakes transmit visible light between the optical component and the optical component opening.

2. The electronic device defined in claim 1 wherein the optical component comprises an ambient light sensor configured to measure ambient light that passes through the optical component opening and that passes through the layer of polymer with the embedded thin-film interference filter flakes.

3. The electronic device defined in claim 1 wherein the display comprises a display cover layer, wherein the display has an active area in which the image is viewable through the display cover layer and has an inactive area, and wherein the opaque masking layer and the optical component opening overlap the inactive area.

4. The electronic device defined in claim 3 wherein the opaque masking layer has an appearance in the inactive area and wherein the layer of polymer has a visible light transmission of less than 20% to match the appearance of the opaque masking layer in the inactive area.

5. The electronic device defined in claim 1 wherein the embedded thin-film interference filter flakes are configured to scatter visible light.

6. The electronic device defined in claim 1 wherein the layer of polymer with the embedded thin-film interference filter flakes is configured to exhibit a haze of at least 20%.

7. An electronic device comprising:
a housing;
input-output devices mounted in an interior region of the housing;
an optical component aligned with a transparent region in the housing; and
a diffuser between the transparent region and the optical component, wherein the diffuser comprises a layer of polymer with embedded flakes of inorganic dielectric material that are configured to scatter light, wherein each of the embedded flakes has a stack of dielectric layers with alternating refractive index values between first layers with first refractive index values and second layers with second refractive index values, wherein each of the second refractive index values is lower than each of the first refractive index values, and wherein the stack of dielectric layers forms a thin-film interference filter.

8. The electronic device defined in claim 7 wherein each stack of dielectric layers is configured to block infrared light.

9. The electronic device defined in claim 7 wherein the stacks of dielectric layers are configured to pass more visible light in at least one visible light wavelength band than infrared light of greater than 740 nm.

10. The electronic device defined in claim 7 wherein the diffuser exhibits a haze of at least 20%.

11. The electronic device defined in claim 7 wherein the diffuser is configured to pass visible light in first and second visible light wavelength bands and wherein the diffuser is configured to block visible light in a third visible light wavelength band.

12. The electronic device defined in claim 11 wherein the third visible light wavelength band is between the first and second visible light wavelength bands.

13. The electronic device defined in claim 7 wherein the diffuser is configured to:
pass light in a visible light wavelength band;
pass light in an infrared light wavelength band; and
block light at wavelengths between the visible light wavelength band and the infrared light wavelength band.

14. The electronic device defined in claim 7 wherein the optical component comprises a light sensor.

15. The electronic device defined in claim 7 wherein the optical component comprises a light-emitting device.

16. The electronic device defined in claim 7 wherein the optical component comprises an ambient light sensor.

17. An electronic device, comprising:
a housing having a transparent region;
a diffuser having a layer of polymer with embedded thin-film interference filter flakes overlapping the transparent region; and
an optical component configured to receive light through the transparent region and the diffuser, wherein the embedded thin-film interference filter flakes transmit light between the optical component and the optical component opening.

18. The electronic device defined in claim 17 wherein the diffuser is characterized by a haze of at least 10%.

19. The electronic device defined in claim 18 wherein the diffuser is configured to block light in an infrared light wavelength band and wherein the optical component comprises a color ambient light sensor.

20. The electronic device defined in claim 18 wherein the diffuser is configured to pass light at a visible light wavelength band, is configured to pass light at an infrared light wavelength band, and is configured to block light at wavelengths between the visible light wavelength band and the infrared light wavelength band.

* * * * *